(No Model.)
J. GREFF.
MANURE SCRAPER.
No. 539,509. Patented May 21, 1895.
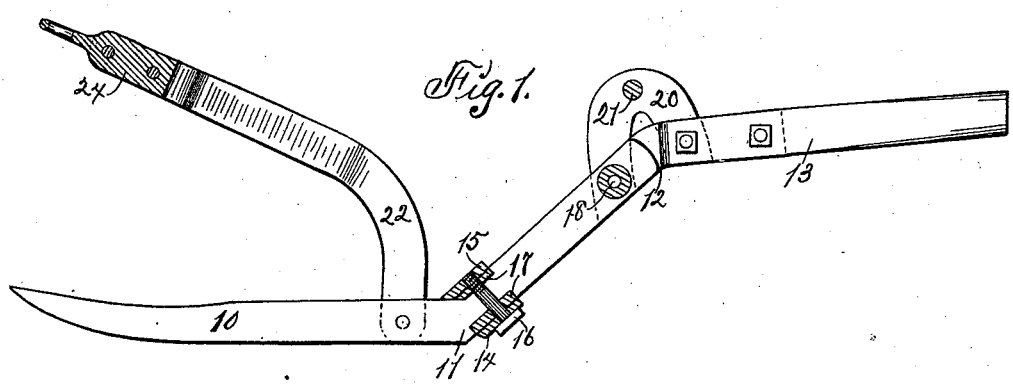
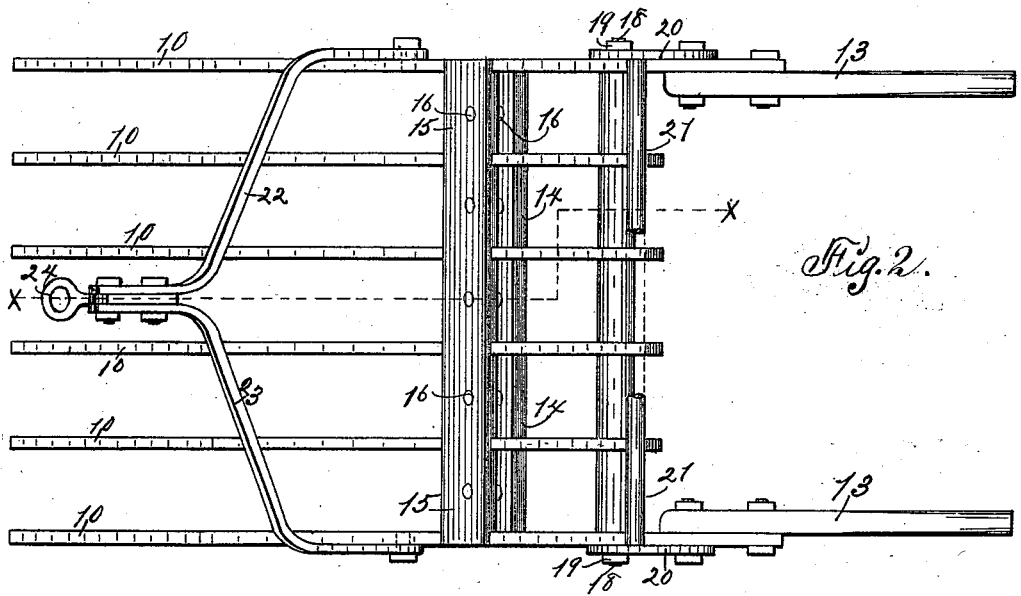
Witnesses:
G. R. Green.
W. A. Ballard.
John Greff,
by J. E. Sweet
his Attorney.

UNITED STATES PATENT OFFICE.

JOHN GREFF, OF REMSEN, IOWA.

MANURE-SCRAPER.

SPECIFICATION forming part of Letters Patent No. 539,509, dated May 21, 1895.

Application filed July 5, 1894. Serial No. 516,688. (No model.)

*To all whom it may concern:*

Be it known that I, JOHN GREFF, a citizen of the United States of America, and a resident of Remsen, in the county of Plymouth and State of Iowa, have invented a new and useful Manure-Scraper, of which the following is a specification.

The object of my invention is to provide improved means for removing manure from stables, barns, and sheds; raking manure about from place to place in a yard; piling manure in heaps; removing heaps of manure to and scattering it upon the surface of the fields; transporting small articles; and similar light work, without the use of which said work would be exceedingly disagreeable and laborious.

My invention consists in the construction, arrangement and combination of parts, hereinafter set forth, pointed out in my claim, and illustrated by the accompanying drawings, in which—

Figure 1 is a sectional elevation on the line $xx$ of Fig. 2. Fig. 2 is a plan view of the complete machine.

In the construction of the machine as shown, the numeral 10 designates a plurality of blades, teeth, or runners, the major portion of which is adapted to occupy a horizontal plane, when employed in scraping or carrying, and rest upon the surface of the earth. Each of the blades 10 is bent upwardly at its forward end, and sharpened, or caused to converge to an apex at the forward end thereof.
Each blade is bent at 11 at an angle of about forty-five degrees and extended upwardly and rearwardly to the point 12, at which point said blade is bent at an angle of about thirty degrees and extended rearwardly a short distance. The interior blades do not have the bend at the point 12 nor the rearward extensions therefrom. To the rearwardly extending portions of the outer blades 10 are secured handles 13, 13, to which manual force is applied to control the operation of the complete machine. A plate 14 is mounted beneath and extends transversely of all of the blades 10 at the rear of the bend 11 therein, and a plate 15 located above and extending transversely of all of the blades 10 is rigidly secured to the plate 14 by means of lag screws 16, or bolts. Stay-plates 17 are interposed between the several blades 10 adjacent to both of the plates 14, 15, which stay-plates serve to retain the blades in a vertical position in their seats. A rod 18 is seated in and transversely of the upper end portions of the blades 10 and bushings mounted upon the said rod are interposed between the several blades, the said rod being retained by means of nuts 19 19 on the ends thereof.

In the practical operation of this device the machine is manipulated through the medium of the handles 13 13 to occupy different planes relative to the horizontal as required to, in the advancement of the machine, insert the forward ends of the blades beneath the substance to be removed, and then permit the machine to assume a recumbent position and travel in the manner of a sledge along the surface of the ground or floor.

It will be observed that the bail extends forward and upward from the points of hinging to the blades, and then forward from a given point to the application of the motive power, by this means permitting of the ready and convenient inclination of the machine without contact of the blades with the bail.

Having thus described my invention, what I claim as new therein, and desire to secure by Letters Patent of the United States therefor, is—

An improved manure scraper comprising a plurality of blades 10 arranged in parallel planes and having their greatest transverse dimensions in vertical planes, the extreme outer blades 10 being longer than the interior blades and extending upwardly and rearwardly and bent at 12, yokes 20, 20 fixed to the outer blades 10 and inclosing and strengthening the bends 12 therein, a stay rod 21 connecting the yokes 20, 20, handles 13, 13, fixed to the rear ends of the outer blades 10, a rod 18 mounted in and transversely of the rear ends of the interior blades and central portions of the outer blades 10 and secured therein, metallic bushings mounted on the rod 18 between the blades 10 and adapted to retain said blades in fixed relations, plates 14, 15 mounted transversely of and above and below the blades 10 in advance of the rod 18, stay plates 17 interposed between the blades 10 between the plates 14, 15, bolts connecting the plates 14, 15 and stay plates 17 rigidly, and a bail hinged to the outer blades 10 and projecting forward and upward therefrom, as shown and described.

In testimony whereof I hereunto have set my hand in the presence of two witnesses.

JOHN GREFF.

In presence of—
A. J. CUSHMAN,
G. W. HARTLEY.